(12) United States Patent
Lolli et al.

(10) Patent No.: US 9,115,270 B2
(45) Date of Patent: Aug. 25, 2015

(54) TYRE REPAIR SEALING COMPOSITION

(71) Applicant: TEK GLOBAL S.R.L., Pesaro (IT)

(72) Inventors: Sergio Lolli, Pesaro (IT); Erika Leri, Rivoli (IT); Fabrizio Ardissone, Turin (IT)

(73) Assignee: TEK GLOBAL S.R.L., Pesaro (IT)

( * ) Notice: Subject to any disclaimer, the term of this patent is extended or adjusted under 35 U.S.C. 154(b) by 0 days.

(21) Appl. No.: 14/561,683

(22) Filed: Dec. 5, 2014

(65) Prior Publication Data

US 2015/0087746 A1   Mar. 26, 2015

Related U.S. Application Data

(63) Continuation of application No. 13/305,237, filed on Nov. 28, 2011, now abandoned, which is a continuation of application No. 13/076,984, filed on Mar. 31, 2011, now abandoned, which is a continuation of application No. 12/867,296, filed as application No. PCT/IB2008/003645 on Dec. 30, 2008, now abandoned.

(30) Foreign Application Priority Data

Feb. 18, 2008   (IT) .............. TO2008A0120

(51) Int. Cl.
| | | |
|---|---|---|
| *B60C 23/00* | (2006.01) | |
| *C08L 7/02* | (2006.01) | |
| *C08K 5/053* | (2006.01) | |
| *B29C 73/16* | (2006.01) | |
| *C08K 5/05* | (2006.01) | |
| *C08L 9/08* | (2006.01) | |
| *C08L 21/02* | (2006.01) | |
| *C09K 3/10* | (2006.01) | |
| *B29L 30/00* | (2006.01) | |
| *C08L 7/00* | (2006.01) | |
| *C08L 9/10* | (2006.01) | |
| *C08L 13/02* | (2006.01) | |

(52) U.S. Cl.
CPC ............... *C08L 7/02* (2013.01); *B29C 73/163* (2013.01); *C08K 5/05* (2013.01); *C08L 9/08* (2013.01); *C08L 21/02* (2013.01); *C09K 3/1006* (2013.01); *B29L 2030/00* (2013.01); *C08K 5/053* (2013.01); *C08L 7/00* (2013.01); *C08L 9/10* (2013.01); *C08L 13/02* (2013.01); *C08L 2205/03* (2013.01)

(58) Field of Classification Search
CPC ............ B60C 23/00; C08L 7/02; C08K 5/053
USPC ........................ 524/388, 386; 152/509, 502
See application file for complete search history.

(56) References Cited

U.S. PATENT DOCUMENTS

2002/0121331 A1 * 9/2002 Gerresheim et al. .......... 156/115

FOREIGN PATENT DOCUMENTS

JP   2006-328180   * 12/2006

* cited by examiner

*Primary Examiner* — James J Seidleck
*Assistant Examiner* — Deve E Valdez
(74) *Attorney, Agent, or Firm* — Ladas & Parry LLP

(57) ABSTRACT

A tyre repair sealing composition having: 30 to 80% natural latex, 5 to 35% synthetic latex, and 10 to 60% ethylene glycol, and wherein the diameter of the synthetic latex particles advantageously has a mean particle-size distribution of 0.04 to 0.5 μm.

15 Claims, 6 Drawing Sheets

Pressure-time graph of 75% synthetic latex formula

Pressure-time graph of hot-tested 5% synthetic latex formula

Pressure-time graph of hot-tested 10% synthetic latex formula

Pressure-time graph of hot-tested 15% synthetic latex formula

Pressure-time graph of hot-tested 20% synthetic latex formula

TYRE REPAIR SEALING COMPOSITION

CROSS REFERENCE APPLICATIONS

This application is a continuation of U.S. patent application Ser. No. 13/305,237 filed on 28 Nov. 2011 which is a continuation of Ser. No. 13/076,984 filed Mar. 31, 2011, (now abandoned) which is a continuation of U.S. patent application Ser. No. 12/867,296 which is a 371 of International Application PCT/IB2008/003645 filed Dec. 30, 2008, which claims the benefit of Italian Application No. TO2008A 000120 filed Feb. 18, 2008, the content of which is incorporated herein by reference.

TECHNICAL FIELD

The present invention relates to a tyre repair sealing composition.

BACKGROUND ART

Tyre punctures are known to be repaired with sealing composition, which is injected into the tyre to repair the puncture from the inside and make the tyre airtight.

Various types of sealing compositions are known, in which a rubber, normally natural rubber, latex is mixed with adhesive and antifreeze.

Sealing compositions of this sort have the drawback, if kept for long periods of time, of the latex and adhesive particles combining to form a creamy composition which, when dispensed, clogs the dispenser valve and fails to repair the puncture properly.

Research by the inventors has shown one reason for clogging of the dispenser valve would appear to be the large size 1 micron—and uneven, unstable size distribution of the natural rubber particles.

Compositions containing no adhesive are also known, but which also result in clogging of the dispenser valve.

A need is therefore felt for a tyre repair sealing composition designed to eliminate the drawbacks of known compositions.

DISCLOSURE OF INVENTION

It is an object of the present invention to provide a sealing composition that is stable over time, and whose rubber latex particles undergo no aggregation resulting in clogging of the dispenser valve.

BRIEF DESCRIPTION OF THE DRAWINGS

According to the present invention, there is provided a sealing composition as claimed in claim 1.

The present invention will be described with reference to the accompanying drawings, in which.

BEST MODE FOR CARRYING OUT THE INVENTION

Figure 1:
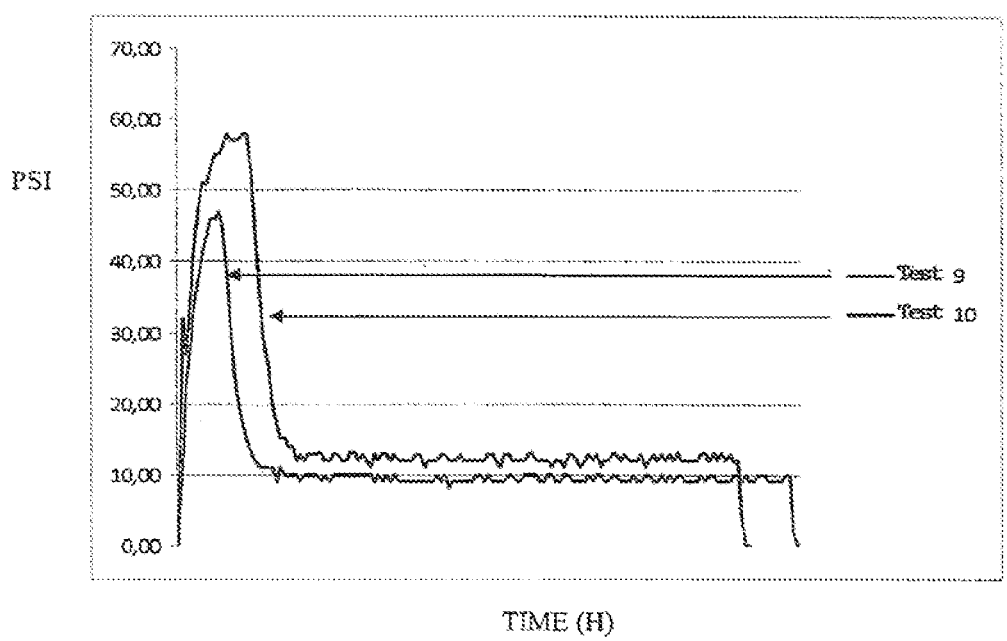
FIG. 1 shows a comparison, relative to formula D described below (carboxylated synthetic latex and ethylene glycol), of a sample settled for 48 hours in contact with air (test 9) and a sample settled for 2 hours and tested immediately (test 10)
Figure 2:
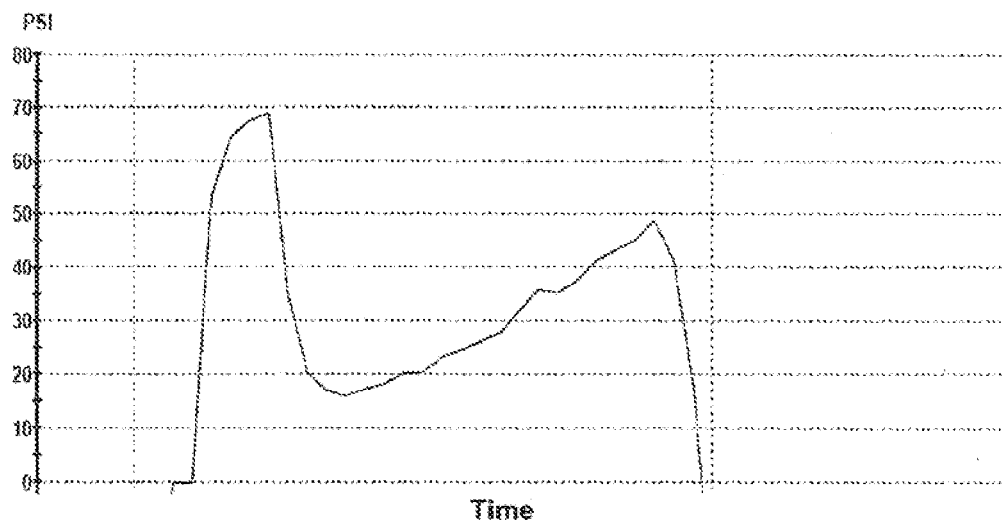
FIG. 2 shows a pressure-time graph of the 0% synthetic latex formula in Example 4.
Figure 3:
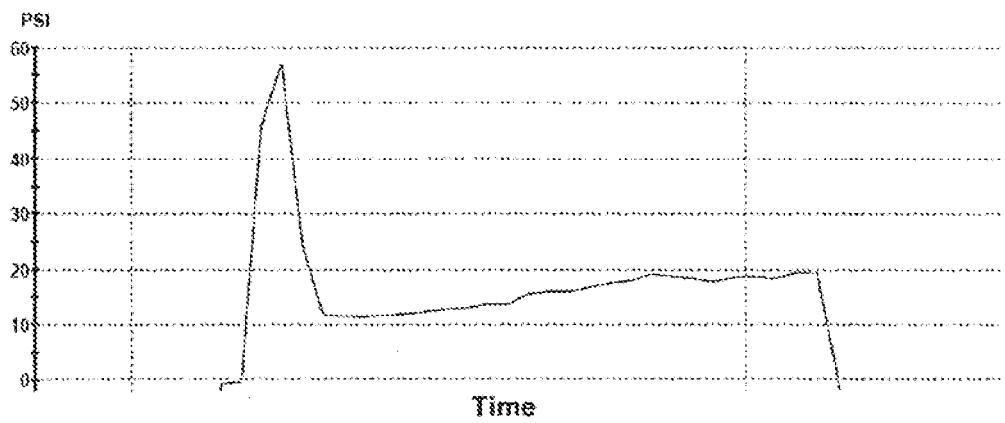
FIG. 3 shows a pressure-time graph of the 10% synthetic latex formula in Example 4.
Figure 4:
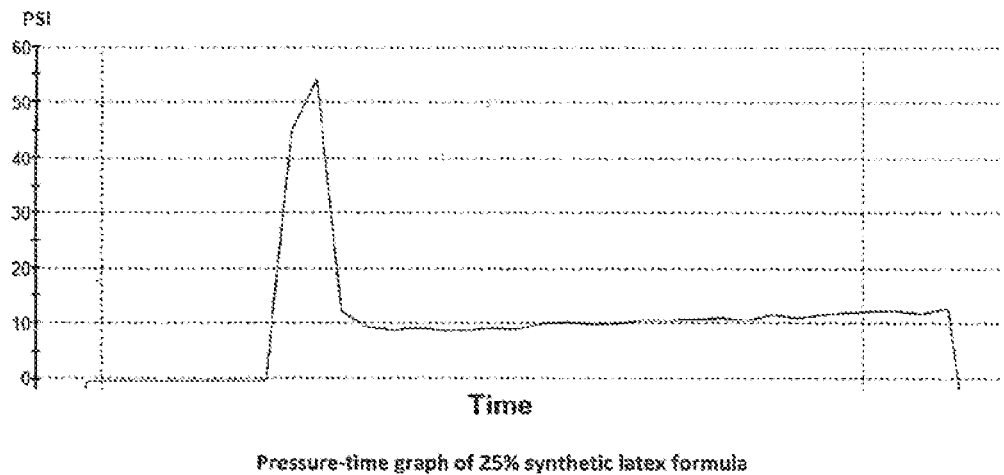
FIG. 4 shows a pressure-time graph of the 25% synthetic latex formula in Example 4.
Figure 5:
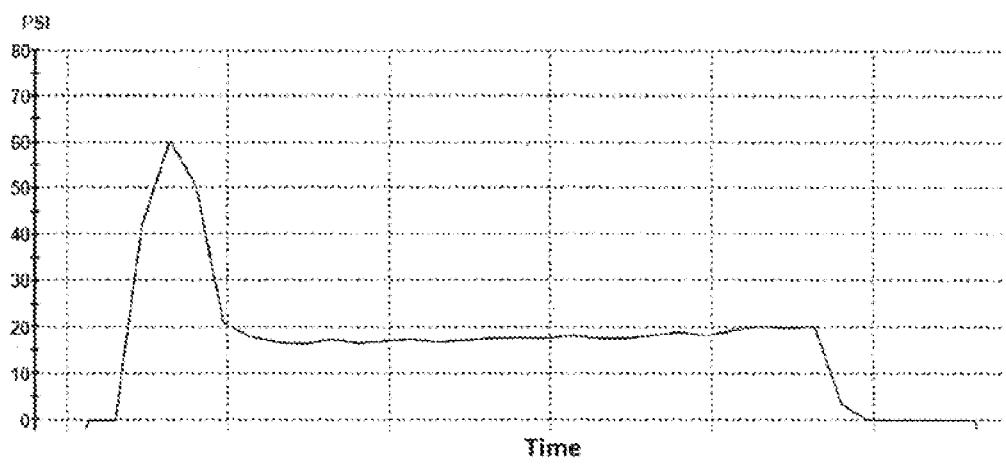
FIG. 5 shows a pressure-time graph of the 50% synthetic latex formula in Example 4.
Figure 6:
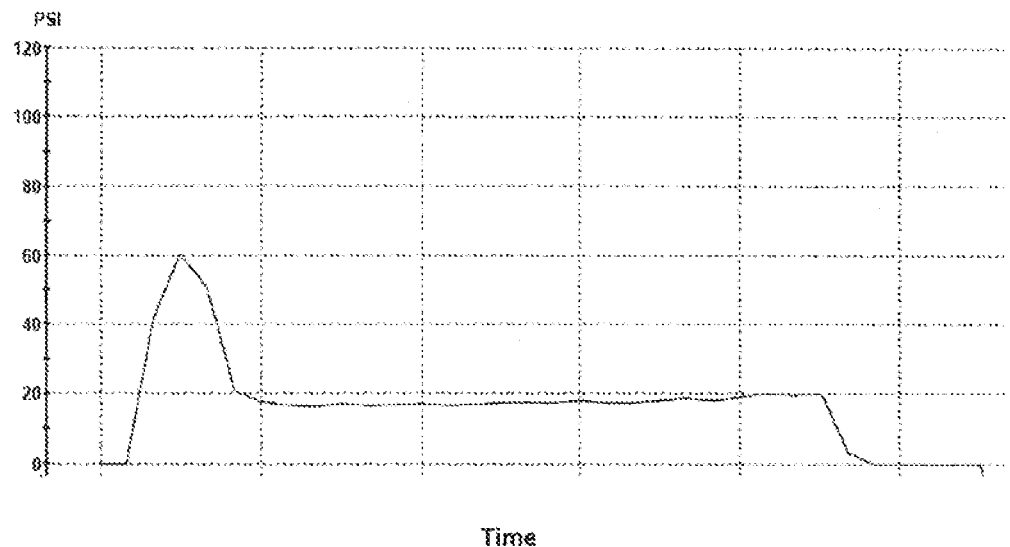
FIG. 6 shows a pressure-time graph of the 75% synthetic latex formula in Example 4.
Figure 7:
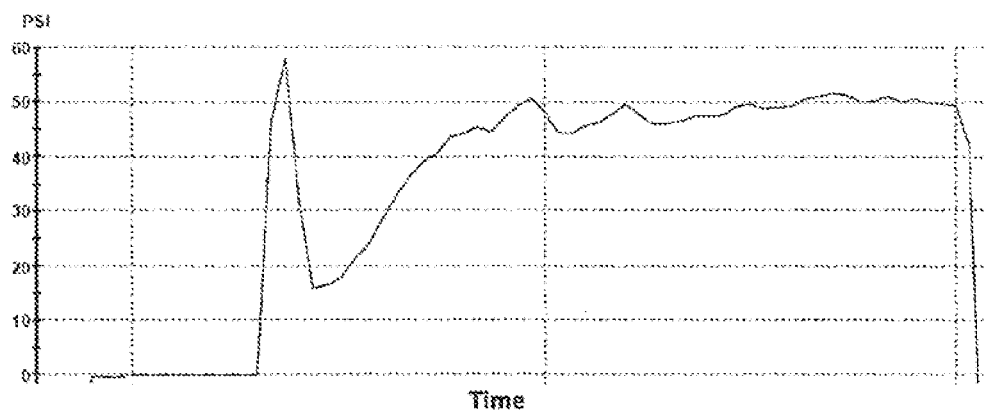
FIG. 7 shows a pressure-time graph of a 5% synthetic latex formula hot-tested as in Example 5.

In a preferred embodiment, the synthetic latex has a mean particle size of 0.04 to 0.5 μm, and was advantageously used to manufacture a sealing composition. This formula provides for considerably stabilizing the sealing composition and so preventing particle aggregation, while at the same time maintaining excellent sealing power characteristic of natural-latex-based compositions.

A synthetic latex particle diameter with a mean particle-size distribution of 0.05-0.3 μm was found to be preferable, and even more preferable with a particle-size distribution of 0.1.

According to one aspect of the invention, the sealing composition preferably comprises 40 to 70% of natural latex, 1.0 to 20% of synthetic latex, and 20 to 50% of ethylene glycol. More preferably, the composition comprises:

50-52% of natural latex
14-16% of synthetic latex
31-33% of ethylene glycol

The synthetic latex has a gelation rate, measured by Mallon mechanical stabilty testing based on J5-K6387, of preferably at least 25%, and more preferably of over 50%, and is advantageously selected from the group comprising styrene-butadiene and carboxylated styrene-butadiene.

The natural latex used gave excellent results when deproteinized.

The sealing composition may also comprise 0.5-3%, preferably 1-2%, of a polyurethane latex, which has a further stabilizing effect.

Finally, the sealing composition may also comprise additives, such as an antioxidant, preferably in the amount of 0.05-3% and more preferably 0.1-1.5%, and a stabilizing agent, preferably in the amount of 0.2-3% and more preferably 0.5-2%.

The present invention will now be described byway of a number of purely non-limiting examples.

EXAMPLES

Example 1

Chemical-Physical Characteristics

Various compositions were compared. While respecting the 3 to 2 latex to ethylene glycol proportions (60% latex 40% ethylene glycol), numerous formulas were prepared, the composition of which is based on other than natural latex; and tests were conducted on the following formulas:

Formula Hartex 101 natural latex and ethylene glycol
Formula A: Euratex S3 and Euratex T22R pure natural latex from Malaya with added non-ionic surface-active agents and ethylene glycol Formula B: Euratex S3 and Euratex T22R pure natural latex as above with non-ionic surface-active agents and carboxylated SEE in a 3:1 ratio and ethylene glycol Formula C: Euratex 2007 softer-film styrene-butadiene (SEE) latex and ethylene glycol Formula D: Euratex 2007 harder-film (carboxylated) styrene-butadiene (SBR) latex and ethylene glycol Formula E: commercial formula prepared in the laboratory.

Though the actual commercial formula was also tested, formula E was included in the tests to study the product in conditions independent, of storage and transport-induced chemical-physical variations, which may strongly affect a highly variable natural-latex-based product.

The results of viscosity testing the above formulas are shown below:

| Formula | Latex | Temperature (° C.) | Viscosity (mPa*s) |
|---------|-------------|------|------|
| A | Natural no1 | 24.3 | 20.4 |
| B | Natural no2 | 23.8 | 20.3 |
| C | Synthetic no1 | 24.2 | 19 |
| D | Synthetic no2 | 23.8 | 18.7 |

No significant differences were observed between the viscosities of the natural latexes (about 20.35 mPa*s) and synthetic latexes (about 18.85 mPa*s). The lower viscosity of the synthetic latexes is closely related to their particle size, which particle-size analysis shows to be much smaller than for natural latexes. More specifically, values range from about 1 μm for natural latexes to one tenth of that, roughly 0.1 μm, for the synthetic latexes tested. Moreover, the synthetic latexes proved to have highly defined particle-size distributions with well centred, very thin Gaussians, indicating a large number of particles with the same diameter.

Example 2

Valve Injection Tests

The test system simulating the composition dispenser system comprised a compressor, a gauge, and a system for supporting the composition container. These were integrated with a pressure gauge and a flow gauge to monitor pressure and flow throughout testing.

Injection of the composition through the valve was therefore tested by simulating the operating conditions of a normal commercial dispenser system.

When the compressor is activated, the composition is expelled from the cartridge and flows along the system's silicone tube, to the end of which the valve, is screwed. As soon as the composition in the cartridge runs out, air is supplied to inflate the tyre. The composition expelled from the cartridges is collected in a container. The test lasts roughly 5 minutes, which is more than enough to reach a final tyre pressure of about 2.5 bars (35 PSI).

Ambient-temperature injection tests were conducted of the compositions in Example 1.

The best results were obtained from the synthetic-latex formulas (C and D) and the natural-latex formula B.

Example 3

Effect of Settling and Contact with Air

Testing was carried out using samples prepared at the time of testing, and the results were compared with those of the same compositions prepared long before testing, to evaluate the settling effect on the samples.

FIG. 1 shows the comparison, relative to formula (carboxylated synthetic latex and ethylene glycol), of the sample settled for 48 hours in contact with air (test 9) and the sample settled for 2 hours and tested immediately (test 10).

As with all the other tested formulas, the sample left longer in contact with air produces a higher pressure peak at injection, and generally maintains a higher pressure than the non-settled sample with no contact with air.

A particular point to note is that, after injection, the carboxylated synthetic latex formula D produces no significant rise in pressure: a fact that is of enormous advantage application-wise.

Example 4

Mixed-Composition Injection Tests

To achieve both troublefree injection in all types of valves and effective, long-lasting repair, the composition has been found to require both natural and synthetic latex. Given the excellent results of formula D in Example 1, the following compositions were first tested:

0% carboxylated synthetic latex (commercial latex)
10% carboxylated synthetic latex 90% commercial latex
25% carboxylated synthetic latex+75% commercial latex
50% carboxylated synthetic latex+50% commercial latex
75% carboxylated synthetic latex+25% commercial latex.

As shown in FIGS. 2-7, the best performance was obtained from mixtures with a synthetic latex percentage ranging between 10 and 25%. Despite the tendency, typical of the type of synthetic latex tested, of maintaining more or less constant pressure after injection, the range of compositions examined snow lower, and therefore more desirable, minimum values. Generally speaking, all the mixed compositions give better results than the commercial formula: both the peak pressures and the pressures during repair are lower, and injection itself is faster (narrower injection peak).

Example 5

Hot Injection Tests

The procedure adopted for these tests is the same as for ambient-temperature testing in Example 2, except that the sample is heated for 1 hour at 70° C. before testing.

Figure 8:
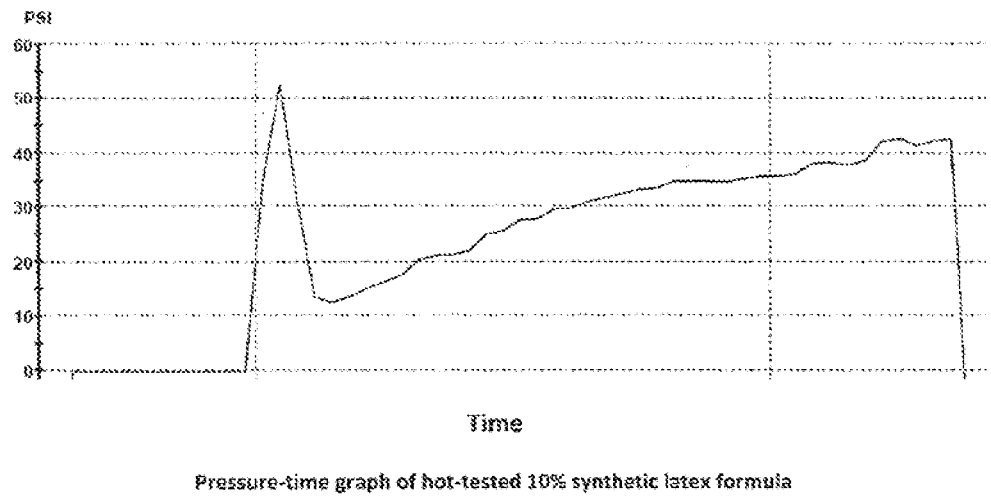
FIG. 8 shows a pressure-time graph of a 10% synthetic latex formula hot-tested as in Example 5.
Figure 9:
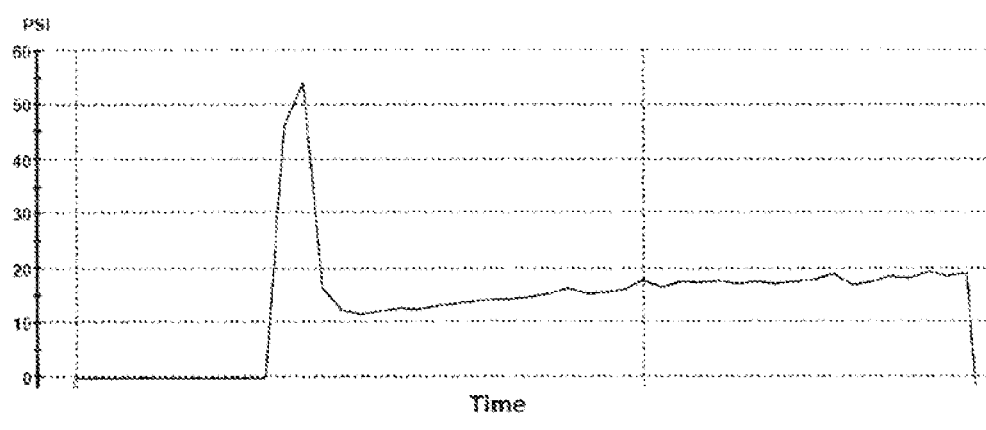
FIG. 9 shows a pressure-time graph of a 15% synthetic latex formula hot-tested as in Example 5.
Figure 10:
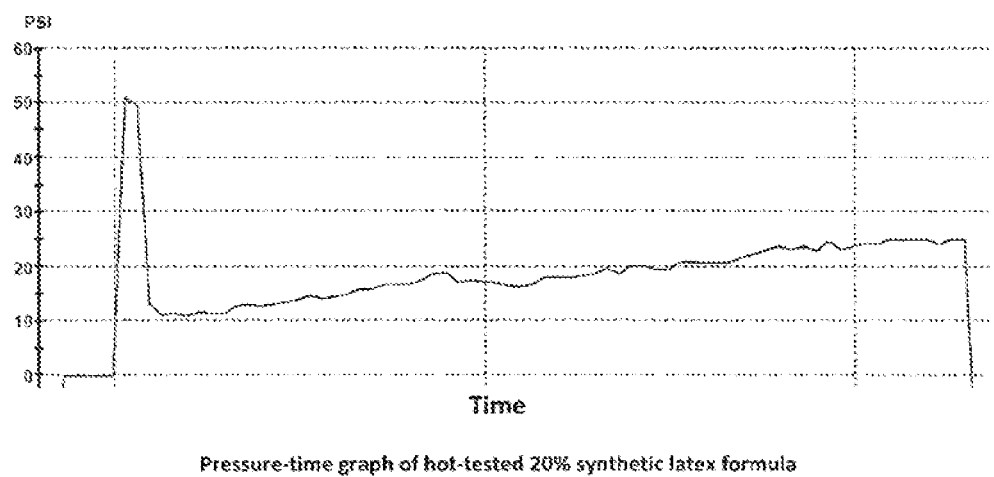
FIG. 10 shows a pressure-time graph of a 20% synthetic latex formula hot-tested as in Example 5.

As shown in FIGS. 8-10, the results show good performance of the mixed composition with 15% carboxylated synthetic latex.

As compared with ambient-temperature testing, hot testing generally records lower injection pressures (lower peaks).

Example 6

Road Tests

The formulas selected above were actually road tested on various types of tyres: winter, summer, symmetrically-grooved, asymmetrically-grooved, and in substantially two different situations: punctures in which the object remains embedded inside the tyre, and punctures in which the object is extracted. In the first case, the nails used to puncture the tyre were left in during repair; and, in the second case, the car was run over a steel plate to puncture the tyre and automatically free the hole. In both cases, the nails used were 6 mm in diameter.

The punctured tyre was then repaired using the dispenser system (each time with a cartridge of the desired 1.5 composition) and covering the area recommended in the handbook to ensure effective repair. In addition to being monitored throughout the test, tyre pressure is checked after testing and again after 24 hours to detect any failed repairs not detected at first.

The best injection test results were obtained from formulas B, C and D. The gauge readings were recorded alongside stopwatch time recordings.

Formula D showed the best performance application-wise, with fairly narrow injection pressure peaks and much lower maximum values than the other two cases, and even the pressure increase after injection was much more gradual, thus indicating a not too excessive rise in pressure, i.e. the composition, flows smoothly into the tyre through the valve, even during normal use of the kit.

Example 7

Mixed Composition Road Tests

As for valve injection testing, road testing was also conducted of compositions with a percentage of synthetic latex ranging between 5 and 20%. The results also confirm the greater effectiveness in terms of repair of the mixed composition with 15% carboxylated synthetic latex.

Generally speaking, all the repairs made using mixtures with synthetic latexes were successful, and the W various tyre pressure recordings were still constant 24 hours after repair. Repair is slightly faster using the 15% synthetic latex mixture, on account of the faster injection stage (narrow peak), which means actual repair (air flow into the tyre) occurs sooner than in the other cases analysed.

The invention claimed is:

1. A sealing composition useful for tyre repair comprising, based on the total weight of the composition:
   30 to 80% natural latex
   5 to 35% synthetic latex
   10 to 60% ethylene glycol
   and 0.5-10% polyurethane latex as a stabilizing agent
wherein said synthetic latex is selected from the group consisting of styrene-butadiene latex, carboxylated styrene butadiene latex and mixtures thereof.

2. A sealing composition as claimed in claim 1, characterized in that the diameter of the particles of said synthetic latex has a mean particle-size distribution of 0.04 to 0.5 μm.

3. A sealing composition as claimed in claim 2, characterized in that the diameter of the particles of said synthetic latex has a mean particle-size distribution of 0.05 to 0.25 μm.

4. A sealing composition as claimed in claim 2, characterized in that said diameter of the particles of said synthetic latex has a mean particle-size distribution of 0.1 μm.

5. A sealing composition as claimed in claim 1, characterized by comprising 40 to 70% of said natural latex.

6. A sealing composition as claimed in claim 1, characterized by comprising 10 to 20% of said synthetic latex.

7. A sealing composition as claimed in claim 1, characterized by comprising 20 to 50% of said ethylene glycol.

8. A sealing composition as claimed in claim 1, characterized by comprising:
   50-52% natural latex
   14-16% synthetic latex
   31-33% ethylene glycol.

9. A sealing composition as claimed in claim 1, characterized in that said natural latex is a deproteinized natural latex.

10. A sealing composition as claimed in claim 5, characterized by comprising 1% to 4% polyurethane latex.

11. A sealing composition as claimed in claim 1, characterized by comprising an antioxidant and a stabilizing agent.

12. A sealing composition as claimed in claim 8, characterized by comprising 0.1-1.5% of said antioxidant, and 0.5-2% of said stabilizing agent.

13. A sealing composition as claimed in claim 1, characterized in that said synthetic latex has a gelation rate, measured by Mallon mechanical stability testing based on JIS-K6387, of at least 25%.

14. A sealing composition as claimed in claim 10, characterized in that said synthetic latex has a gelation rate, measured by Mallon mechanical stability testing based on JIS-K6387, of over 50%.

15. A sealing composition as claimed in claim 1, wherein wherein said synthetic latex comprises carboxylated styrene butadiene latex.

* * * * *